Patented July 24, 1928.

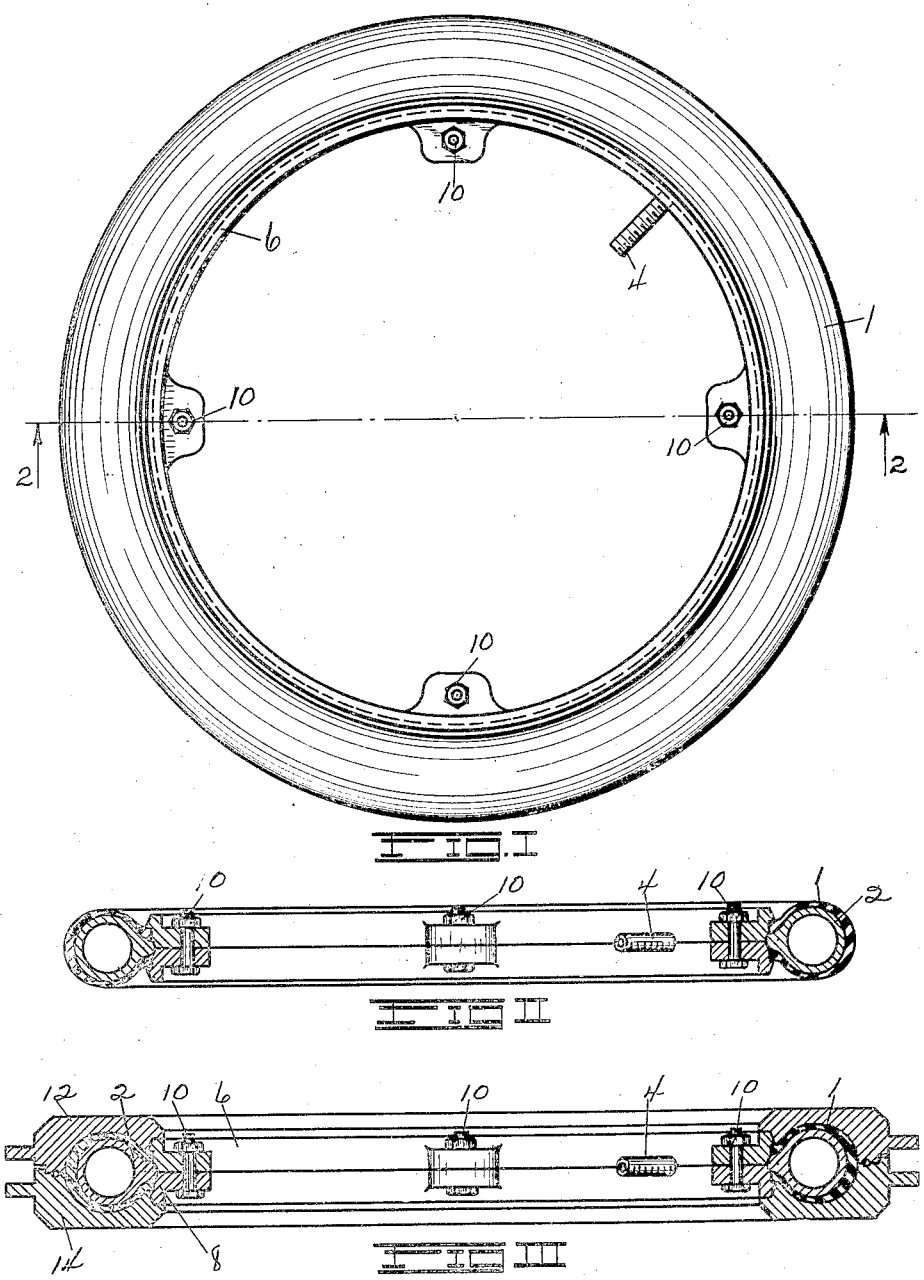

1,678,042

UNITED STATES PATENT OFFICE.

RAYMOND HANSEN, OF CUDAHY, WISCONSIN, ASSIGNOR TO THE FISK RUBBER COMPANY, OF CHICOPEE FALLS, MASSACHUSETTS, A CORPORATION OF MASSACHUSETTS.

VULCANIZING.

Application filed October 24, 1924. Serial No. 745,610.

My invention relates to the manufacture of pneumatic tire casings and more particularly to a method of vulcanizing such casings.

It is one object of my invention to provide a method of vulcanizing casings upon expansible cores, generally termed bags, which shall give a maximum period of adjustment to the carcass material under the most advantageous circumstances and which shall not require any air connections in the vulcanizer and which will permit the casings and enclosing molds to be handled expeditiously. Other objects will be apparent from the following specification and claims.

In the accompanying drawings which illustrate one embodiment of my invention.

Figure 1 is a plan view of a raw casing with the bead clamping rings in position and ready to be inserted in the mold.

Figure 2 is a section on line 2—2 of Figure 1, and

Figure 3 is a section showing the raw casing positioned in the mold.

In carrying out my process I provide a conventional bag shown at 2 with any suitable inflating valve indicated at 4 and insert the bag in the tire casing 1, in the usual manner. If desired the casing may be built up on the bag according to known methods, and my process is particularly advantageous when the latter methods of building are used. I then apply the usual bead retaining rings 6 and 8 to the raw casing as shown in Figures 1 and 2. These rings are secured together in the customary manner by bolts 10 and firmly clamp the bead portions of the casing against the base of the bag. I now partially inflate the bag in a manner later described. The casing is then enclosed in any conventional type of mold as shown at 12 and 14 in Figure 3, and inserted in the vulcanizer. When vulcanizing temperature is applied the entrapped fluid within the bag expands to exert the pressure necessary to stretch and support the casing and fill the mold. After the casing has been properly cured the temperature in the vulcanizer is lowered, the entrapped fluid contracting with the lowering of the temperature, and the molds removed, from the vulcanizer. The casing is then removed from the molds and the valve 4 opened to permit the escape of the entrapped fluid. The valves may obviously be opened at any time subsequent to the curing but I find it convenient to do this at the time the rings 6 and 8 are removed or when the bag is taken from the casing.

It is obvious that the initial inflating pressure of the expanding fluid should be such that the expansion of the fluid upon being heated to the vulcanizing temperature shall be sufficient to give the desired pressure during vulcanization, and that this varies with the fluid used and the vulcanizing temperature. I prefer a fluid which undergoes a relatively great expansion upon the application of heat. Good results have been obtained with carbon-dioxide and ammonium-carbonate. With a vulcanizing temperature of about 293° F. I find that an initial inflating pressure of substantially 45 pounds for carbon-dioxide and ammonium-carbonate give satisfactory pressure during vulcanization. The coefficient of expansion of various fluids are well known and the availability of a fluid for my process easily determined. Since my invention is not dependent on the specific expanding fluid used further description in this connection is believed unnecessary.

An appreciable amount of time elapses between the partial inflation of the bag the insertion of the bag and casing in the mold and of the mold in the heater. During this time the strain resisting elements of the raw casing have an opportunity to adjust themselves, under the tension induced by the partial inflation of the core, without any opposing pressure on the exterior of the casing. When placed in the mold the casing is subjected to the pressure due to the weight of the mold members only, one step nearer the condition under which the casing is to assume its permanent form but still free to adjust itself. The mold is then placed in the vulcanizer and closed by hydraulic pressure or otherwise, another step toward the final curing condition. As the temperature of the vulcanizer rises the rubber of the casings softens and simultaneously the pressure within the core gradually increases until full vulcanizing temperature and pressure are both attained. This gradual increase in pressure permits complete adjustment of the strain resisting elements under the most advantageous conditions. Thus the casing is provided with periods of adjustment not hitherto given. A more uniform product results as well as a decrease in the time and cost of handling.

It will be evident that my process does away with expensive compressed air systems in the heaters and the time consuming and laborious operations of connecting and disconnecting each bag in the heater to and from the air line, while at the same time it permits the use of standard molds and renders it possible to use the conveying systems for handling the molds used with prior methods. After initial inflation the assembly of raw casing, bag and bead rings may be handled in substantially the same manner as are casings supported on iron cores, which is an important advantage.

It will be understood that a wide range of pressures and temperatures are possible depending on the character of the stock, construction of the casing and other well known factors and that the above specific description is illustrative only and my invention is not limited thereto.

I claim:

1. The process of vulcanizing tire casings which comprises securing an inflatable core in the casing, inflating the core an amount sufficient to produce a predetermined pressure within the core when the latter is heated to vulcanizing temperature, inserting the casing in a mold and vulcanizing the casing.

2. The process of vulcanizing tire casings which comprises, clamping the bead portions of the casing against the base of an inflatable core enclosed in the casing, inflating the core while unconfined in a mold to an extent sufficient to produce a predetermined pressure within the core when the latter is heated to vulcanizing temperature, and vulcanizing the casing in a suitable mold.

In testimony whereof I have signed my name to the above specification.

RAYMOND HANSEN.